(12) United States Patent
Eshetu et al.

(10) Patent No.: US 9,470,816 B2
(45) Date of Patent: Oct. 18, 2016

(54) HUMAN VISIBLE AND X-RAY VISIBLE MARKINGS FOR SECURITY SCREENINGS

(71) Applicant: DSA DETECTION LLC, North Andover, MA (US)

(72) Inventors: Abiy Eshetu, Arlington, MA (US); Timothy B. Burton, Danville, NH (US)

(73) Assignee: DSA DETECTION LLC, North Andover, MA (US)

( * ) Notice: Subject to any disclaimer, the term of this patent is extended or adjusted under 35 U.S.C. 154(b) by 152 days.

(21) Appl. No.: 13/765,275

(22) Filed: Feb. 12, 2013

(65) Prior Publication Data
US 2014/0226796 A1    Aug. 14, 2014

(51) Int. Cl.
| G01V 5/00 | (2006.01) |
|---|---|
| G09F 3/02 | (2006.01) |
| G09F 3/00 | (2006.01) |
| A45C 13/42 | (2006.01) |
| B65D 1/34 | (2006.01) |

(52) U.S. Cl.
CPC ............ *G01V 5/0016* (2013.01); *A45C 13/42* (2013.01); *B65D 1/34* (2013.01); *G09F 3/02* (2013.01); *G09F 3/0294* (2013.01); *B65D 2203/00* (2013.01)

(58) Field of Classification Search
CPC ............... G09F 3/02; A61B 19/5244; A61B 2019/5483; A61B 19/54; A61B 2019/5466; A61B 2019/5265; A61B 6/032; A61B 2019/5255; A61B 5/064; A61B 10/0233; A61B 5/055; A61B 2019/5437; A61B 2019/5491; A61B 6/12; A61B 2019/505; A61B 2019/5287; A61B 19/52; A61B 2017/00716; A61B 2017/00725; A61B 6/037; A61B 6/583; A61B 3/0075; A61B 3/152; A61B 3/154; A61B 19/20; A61B 19/201; A61B 19/203; A61B 19/5212; A61B 19/56; A45C 13/42; B65D 1/34; B65D 2203/00; G01V 5/0008; G01V 5/0016
USPC .......................... 378/57, 98.2, 204; 206/216
See application file for complete search history.

(56) References Cited

U.S. PATENT DOCUMENTS

| 5,166,967 | A | | 11/1992 | Fabian | |
|---|---|---|---|---|---|
| 5,311,567 | A | * | 5/1994 | Pellegrino et al. | 378/166 |
| 5,323,443 | A | * | 6/1994 | Lary | 378/165 |
| 5,949,042 | A | * | 9/1999 | Dietz et al. | 235/375 |
| 6,356,621 | B1 | * | 3/2002 | Furumori | A61B 6/12 378/162 |
| 7,127,826 | B2 | * | 10/2006 | Russell | 33/758 |
| 7,761,138 | B2 | | 7/2010 | Wang et al. | |
| 2003/0062373 | A1 | * | 4/2003 | Holland | B64F 1/368 220/660 |
| 2007/0132580 | A1 | * | 6/2007 | Ambrefe, Jr. | 340/541 |
| 2008/0257894 | A1 | * | 10/2008 | Podd | B29C 41/04 220/565 |
| 2009/0108578 | A1 | * | 4/2009 | Commander | 283/72 |
| 2009/0196396 | A1 | * | 8/2009 | Doyle | G01V 5/0008 378/53 |
| 2010/0061521 | A1 | * | 3/2010 | Standar | A61B 6/0414 378/162 |
| 2012/0114103 | A1 | * | 5/2012 | Aust et al. | 378/98.2 |

FOREIGN PATENT DOCUMENTS

| EP | 0077347 A1 | 4/1983 |
|---|---|---|
| EP | 0272901 A2 | 6/1988 |
| EP | 1436775 A1 | 7/2004 |
| EP | 2165314 A1 | 3/2010 |

* cited by examiner

*Primary Examiner* — Glen Kao
(74) *Attorney, Agent, or Firm* — Lando & Anastasi, LLP

(57) ABSTRACT

Embodiments of the present disclosure are directed to x-ray screening accessories and methods of facilitating x-ray screening.

13 Claims, 5 Drawing Sheets

HUMAN VISIBLE AND X-RAY VISIBLE MARKINGS FOR SECURITY SCREENINGS

FIELD OF THE TECHNOLOGY

One or more aspects relate generally to the detection of unapproved items, such as firearms or other weapons, at security checkpoints.

BACKGROUND

Weapon detection is an essential element of many security programs. It is imperative that weapons and other unauthorized items be identified during security screenings at security checkpoints. Weapon detection is crucial for homeland security, particularly in the transportation sector, and security screenings have become an increasingly prevalent tool at airports, import and export facilities, schools, sporting events, and court houses. X-ray technology is often an integral part of comprehensive security programs and is widely used to screen individuals and bags for weapons and other unauthorized items.

SUMMARY

Aspects and embodiments of the present invention relate to security accessories and facilitate x-ray security screening. X-ray screening may be used to screen containers for weapons and other unauthorized items. It may however be difficult to identify by visual inspection the suspect container shown in the x-ray image. Identification and misidentification of containers concealing items of interest present an obstacle to efficient detection activities.

In accordance with aspects of the present disclosure, an x-ray screening accessory is provided comprising a bin including a marker. The marker comprises indicia having an x-ray readable component and a human visible component.

In accordance with some embodiments, the x-ray readable component and the human visible component occupy the same position on the bin.

In accordance with some embodiments, the x-ray readable component and the human visible component are positioned separately.

In accordance with some embodiments, the marker uniquely identifies the bin.

In accordance with some embodiments, the marker identifies the bin using a string of characters.

In accordance with some embodiments, the marker forms a measuring tool on the bin.

In accordance with some embodiments, the marker forms a coordinate system on the bin.

In accordance with some embodiments, the marker is applied to the bin by a printing operation.

In accordance with some embodiments, the x-ray readable component is embedded in the bin.

In accordance with some embodiments, the x-ray readable component is molded into the bin.

In accordance with some embodiments, the marker comprises metallic ink.

In accordance with some embodiments, the x-ray readable component comprises metallic ink.

In accordance with some embodiments, the human visible component comprises metallic ink.

In accordance with some embodiments, the marker comprises a metallic polymer.

In accordance with some embodiments, the bin comprises a plastic receptacle.

In accordance with an aspect of the present disclosure, an x-ray screening accessory is provided comprising a bin including a first and second marker, wherein both markers comprise indicia having an x-ray readable component and a human visible component, wherein the first marker is capable of identifying the bin using a string of characters and the second marker is capable of identifying a measurement of length along at least one portion of the bin.

In accordance with an aspect of the present invention, an x-ray screening accessory is provided comprising a marker having indicia including an x-ray readable component and a human visible component, and an attachment mechanism that attaches the marker to a container.

In accordance with some embodiments, the marker comprises metallic ink.

In accordance with some embodiments, the x-ray readable component comprises metallic ink.

In accordance with some embodiments, the human visible component comprises metallic ink.

In accordance with an aspect of the present disclosure, a method of facilitating x-ray security screening is provided comprising providing a bin including a marker, the marker comprising indicia having an x-ray readable component and a human visible component and, providing instructions for placement of a container to be screened in the bin.

BRIEF DESCRIPTION OF THE DRAWINGS

Various aspects of several embodiments are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
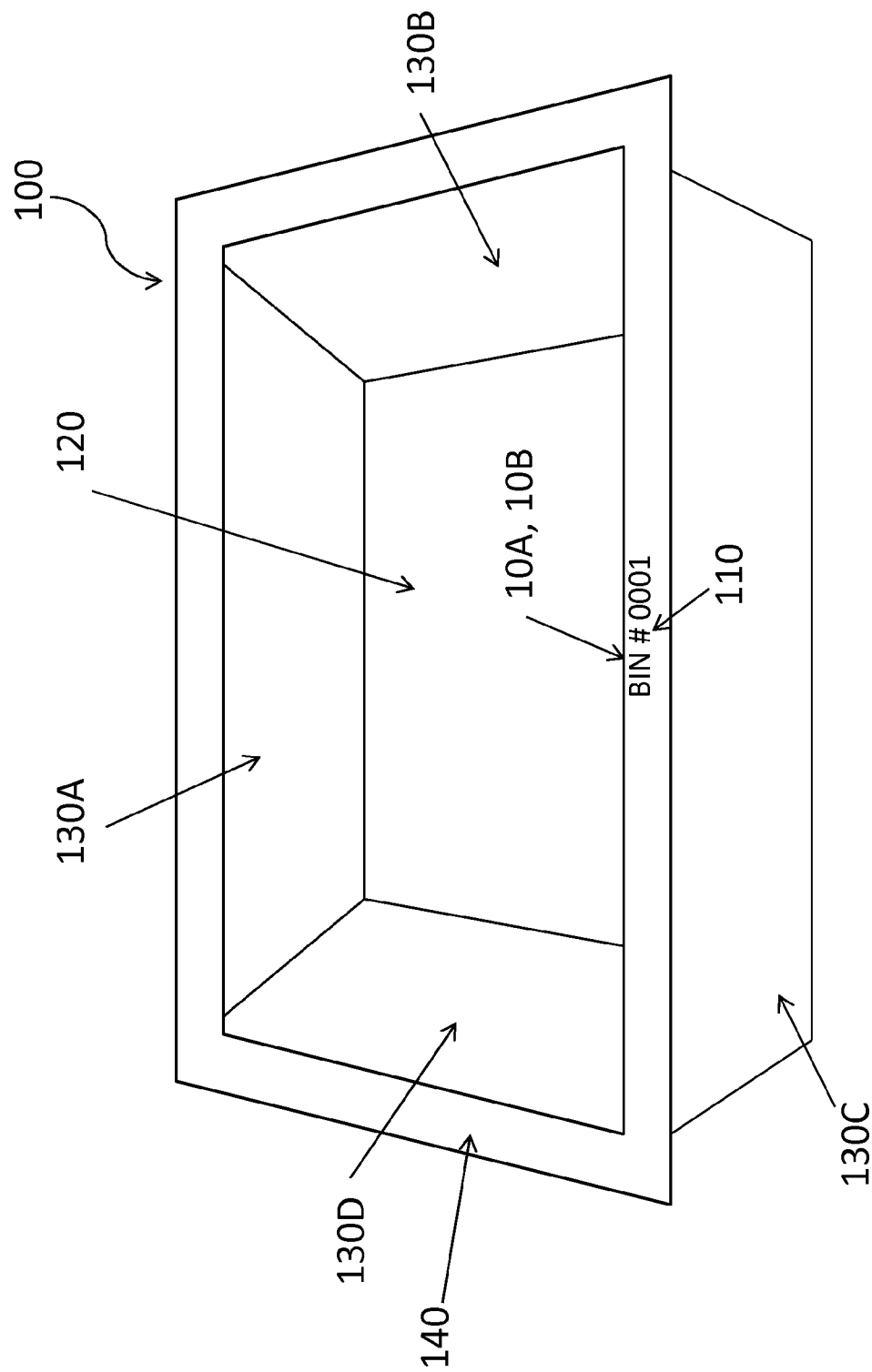
FIG. 1 is a perspective view of a security bin comprising an x-ray marker in accordance with aspects and embodiments.

Aspects and embodiments of the present disclosure are directed to security accessories that may facilitate the identification of a container holding an item of interest. Items of interest may be items that an operator, such as a security officer of a security screening device, determines should be further investigated.

X-ray technology is widely used in security programs to screen the contents of containers. Containers may include packages, hand-bags, back-packs, luggage, shoes, electrical devices, and any other structures capable of concealing a weapon or other unauthorized item. At security checkpoints having x-ray technology, containers are screened by an x-ray machine that displays to an operator an image of the container and its contents. X-ray imaging allows security officers to review the contents concealed in containers and determine if the container is concealing an item of interest that requires further investigation.

When arriving at a security check point having x-ray technology, individuals are generally directed to place any containers in their possession on a conveyor belt that directs the containers through an x-ray screening machine. An x-ray image is then displayed to an x-ray machine operator. The operator analyzes the x-ray image and determines if there are any items of interest concealed in the screened containers. In other systems, a computer may automatically analyze the x-ray image, detect items of interest, and identify the relevant bin for further inspection.

To facilitate x-ray screening, many security checkpoints provide receptacles, such as bins, in which individuals can place one or more containers. A bin may be placed on a conveyor belt of the x-ray screening system such that the contents of the bin, and thus the contents of containers placed therein, can be imaged and analyzed by an operator and/or a computer.

X-ray images do not, however, show easily identifiable, visual characteristics of the containers in a bin. If an operator determines that a bin holding a container does conceal an item of interest, it may be difficult for the operator to identify the correct container by visual inspection. This is particularly problematic at security check points that screen a high volume of containers, for example, the security checkpoints at airports, because correctly identifying bins holding suspect containers can be time consuming. Further, if an operator misidentifies a container and does not locate an item of interest displayed in an x-ray image, an unauthorized item, such as a weapon, may pass through the checkpoint. Identification and misidentification of containers thus presents an obstacle to efficient and effective x-ray security screening.

In accordance with embodiments of the present disclosure, a marker is provided that may facilitate the identification of a container that includes an item of interest. The markers may be used to easily identify the location of a container to be further searched. The markers of the present invention may have indicia that are both visible in an x-ray image and by the naked eye. For example, the marker may comprise indicia having a component that is x-ray readable, visible and/or recognizable in an x-ray image and a component that is visible to the naked eye and thus allows an operator to identify the container by simply looking at the marker. The indicia may be, for example, a string of alphanumeric characters, symbols, combinations thereof, and any other identifiers. In accordance with some embodiments, the markers of the present disclosure may be used to facilitate the identification of a security holding a container. In accordance with other embodiments, the markers of the present disclosure may be used to determine the size and location of an item of interest within a bin. In accordance with other aspects and embodiments, the markers of the present disclosure may be used to facilitate the identification of containers without the use of a bin.

In accordance with an embodiment of the present disclosure and referring to FIG. 1, security bin 100 comprises a marker 110. Security bin 100 may be made of any material that does not interfere with x-ray imaging of containers placed in the bin. For example, security bin 100 may be an injection molded polymeric material, such as plastic. Bin 100 has a supporting surface 120, side walls 130A, 130B, 130C, and 130D, and lip 140.

Marker 110 comprises indicia having an x-ray readable component 10A and a component that is visible to the naked eye, human visible component 10B. The x-ray readable component 10A and the human visible component 10B are a string of alphanumeric characters and symbols that serve as identifying indicia. Marker 110 may comprise a metallic ink, or any other ink comprising both an x-ray readable component and a human visible component. Marker 110 may, comprise a metallic polymer. Marker 110 may be affixed, printed, molded, or embedded in bin 100 in any way.

For example, marker 110 may comprise a label printed with indicia in ink having components 10A and 10B. The label may be affixed to the bin by means of an adhesive, or may be a self-adhesive sticker. Similarly, marker 110 may be indicia applied to bin 100 by a stamping operation using ink having an x-ray readable component 10A and a human visible component 10B. Bins may be stamped with indicia to create a marker to facilitate identification. The indicia of marker 110 may be applied to a security bin by a printing operation, such as ink jet printing or stencil printing, or other printing methods, using an ink having a human visible component 10B and an x-ray readable component 10A. Alternatively, indicia may be written on bin 100 with a writing implement that dispenses ink having x-ray readable and human visible components to create a marker. Alternatively, indicia may be molded into bin 100.

Marker 110 may facilitate x-ray security screenings by allowing an x-ray machine operator, after reviewing containers in bin 100 and marker 110 in an x-ray image, to easily identify the bin holding the scanned containers. In addition or in the alternative, a computer may analyze the x-ray image, identify items of interest, and output information relating to the bin and/or container requiring further search. Both the x-ray readable component 10A and the human visible component 10B of marker 110 are shown as a single indicia on the upper surface of lip 140 of bin 100. Though components 10A and 10B are shown in marker 110 combined in a single indicia, components 10A and 10B may be separate from one another. Component 10A of marker 110 can be positioned anywhere on bin 100 such that it is visible in an x-ray image and component 10B of marker 110 can be positioned anywhere on bin 100 such that an operator can identify bin 100 by visual inspection of marker 110.

Figure 2:
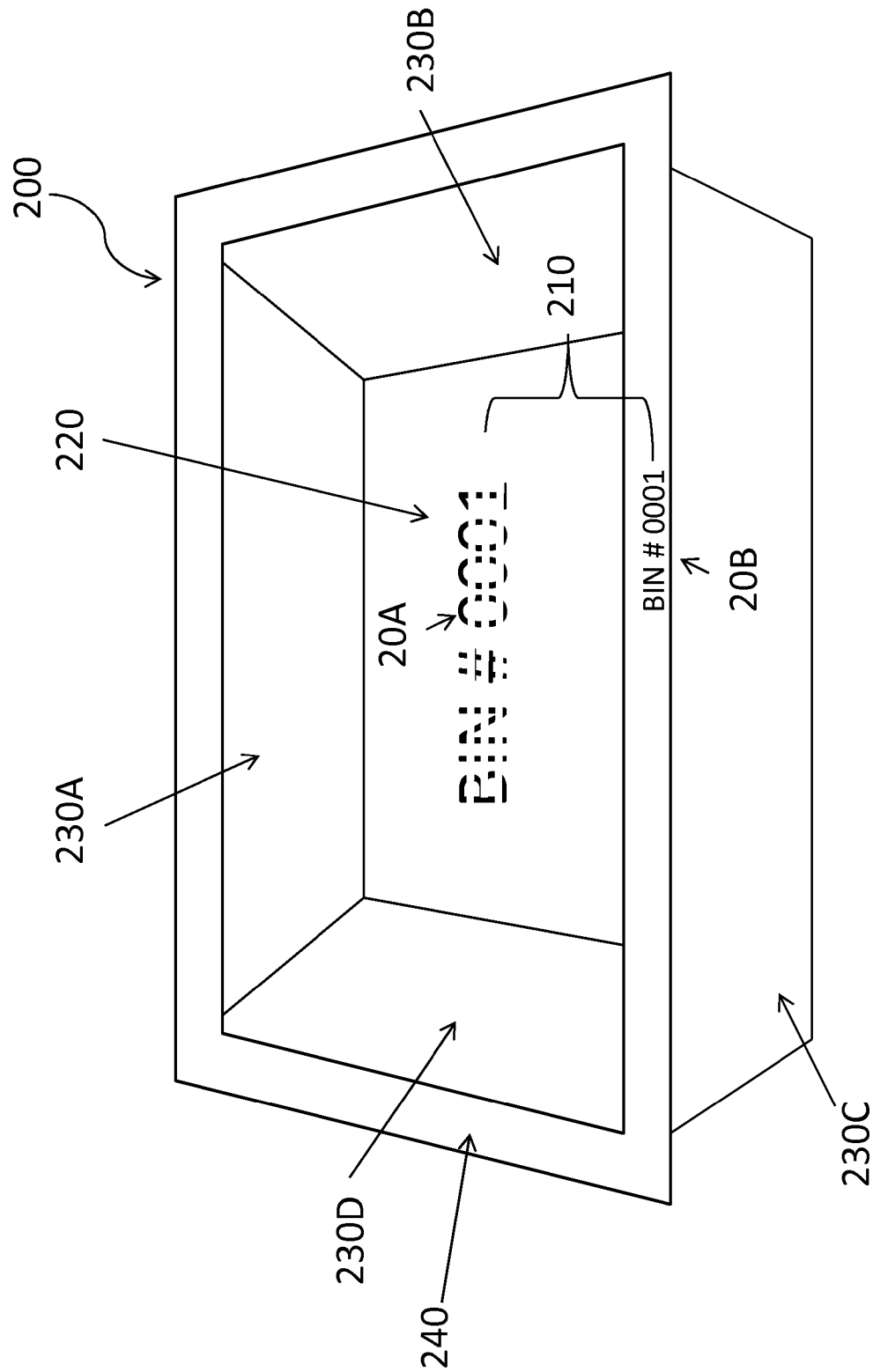
FIG. 2 is a perspective view of a security bin comprising an embodiment of an x-ray marker in accordance with aspects and embodiments.

For example and referring to FIG. 2, security bin 200 comprises a marker 210. Bin 200 has a supporting surface 220, side walls 230A, 230B, 230C, and 230D, and lip 240. Marker 210 comprises an x-ray readable component 20A in the supporting surface 220 of bin 200 and a human visible component 20B on the upper surface of lip 240 of bin 200.

X-ray readable component 20A may be embedded or molded into bin 200, and is shown in FIG. 2 as being embedded in the supporting surface of bin 200. For example, x-ray visible component 20A may be embedded or molded into bin 200 during the fabrication of bin 200. The x-ray visible component may not be human visible. A corresponding human visible component may be printed or affixed on bin 200 in a different location. In the alternative, the human visible component can be placed on a surface of bin 200 in a corresponding location to an embedded x-ray visible component. For example, if x-ray readable component 20A was embedded in lip 240 of bin 200, human visible component 20B could be positioned on the upper surface of lip 240 in a position corresponding to the location of embedded x-ray readable component 20A. The human visible component may not be x-ray readable and may be any visual indicia.

The markers of the present invention may be used to facilitate x-ray security screenings by providing operators with visual markers that may assist operators in determining if further investigation of a detected item of interest is necessary. Generally, security programs maintain guidelines for instructing when a detected item of interest needs to be further investigated. These guidelines may relate to the size of the item. For example, some security protocols may require all items of interest greater than about three inches in length or width to be further investigated.

Figure 5:
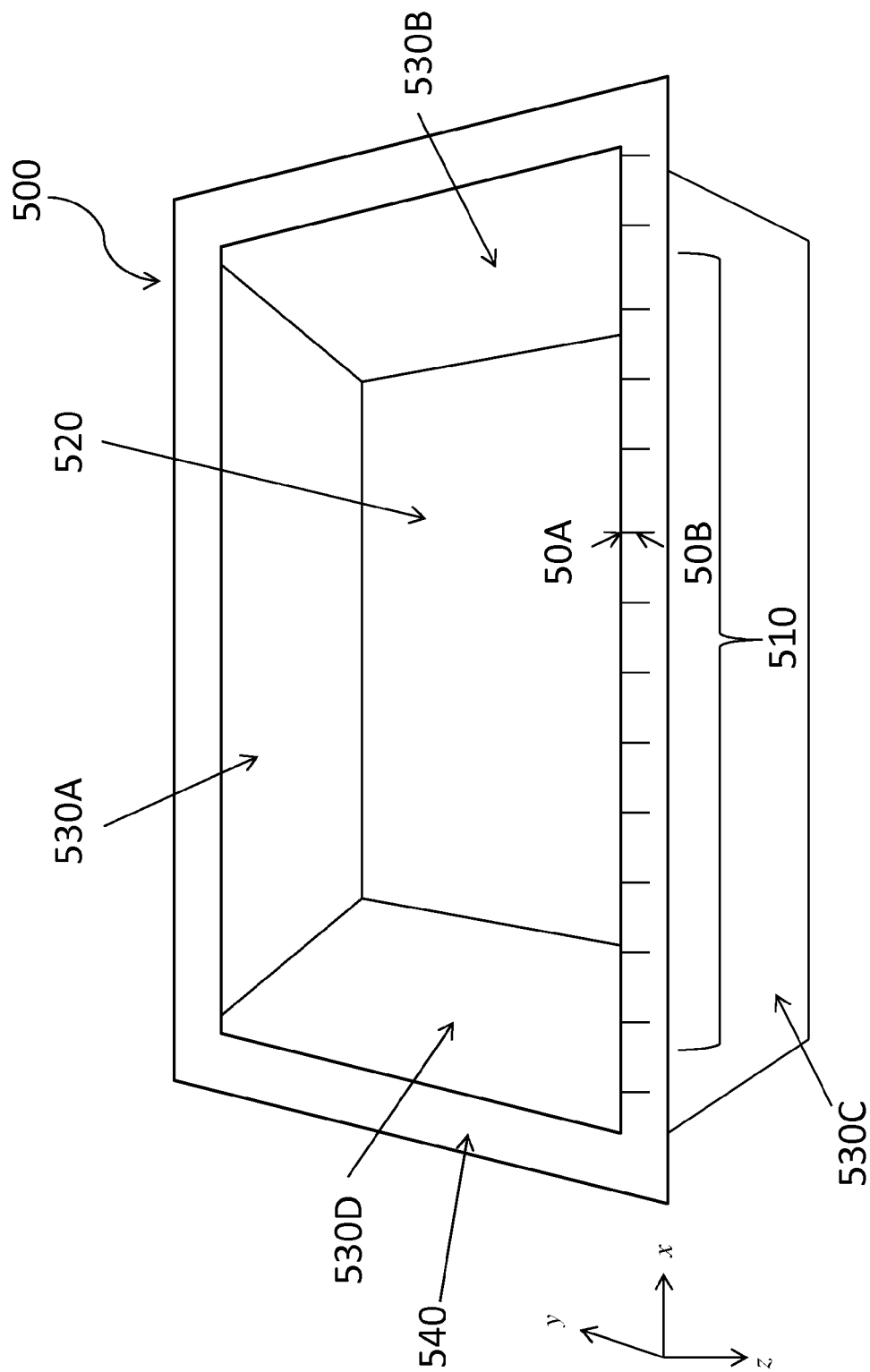
FIG. 5 is a perspective view of a security bin comprising an embodiment of an x-ray marker in accordance with aspects and embodiments.

For example and referring to FIG. 5, security bin 500 comprises marker 510. Bin 500 has a supporting surface 520, side walls 530A, 530B, 530C, and 530D, and lip 540. Marker 510 comprises a plurality of indicia positioned on security bin 500. The indicia of marker 510 comprise an x-ray readable component 50A and a human visible component 50B. The indicia of marker 510 may be positioned on bin 500 to enable an operator to determine the size of an item of interest in a container in bin 500. For example, the indicia of marker 510 may comprise hashes and/or alphanumeric characters that facilitate the measurement of items. For example, the indicia may be uniformly spaced from one another so as to form an x-ray readable and human visible/readable ruler on bin 500. The indicia of marker 510 may, for example, be placed about one centimeter from another, or may for example, be placed about one inch from one another. Further indicia may be used to demarcate smaller increments of measure.

Marker 510 comprises indicia on portion of lip 540 positioned above supporting wall 530C. Marker 510 may have indicia disposed on other portions of security bin 510. Marker 510 may, for example, comprise indicia positioned on the upper surface of the portion of lip 540 above supporting wall 530C and on the upper surface of the portion of lip 540 above supporting wall 530D. In some embodiments, the indicia may form an x-y coordinate system that allows an operator not only to assess the length, height, and surface area of the item of interest, but also to identify its position in the security bin. Where three dimensional x-ray imaging is used, marker 510 may further comprise indicia that extend in the z-direction to form a three dimensional coordinate system.

In accordance with embodiments, the markers of the present invention may be used to facilitate the identification of any containers that undergo x-ray security screening. For example, x-ray technology is often used to scan checked luggage for items of interest. Many items of luggage closely resemble one another and it may be difficult for an operator of an x-ray screening machine to identify, by visual inspection, the container concealing an item of interest amongst all containers being scanned.

Figure 3:
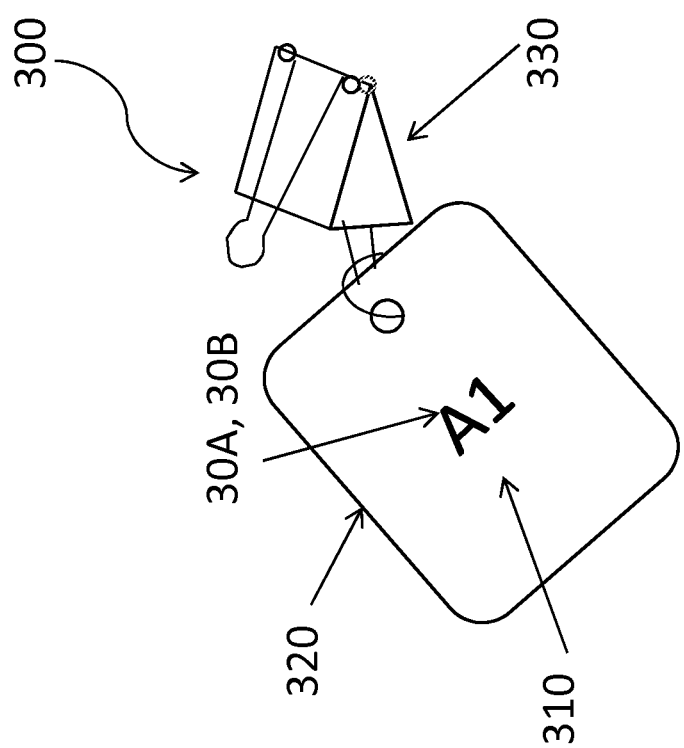
FIG. 3 is a perspective view of an embodiment of an x-ray marker in accordance with aspects and embodiments.

In accordance with embodiments and referring to FIG. 3, marker 300 comprises indicia 310 on a substrate 320. Indicia 310 comprises an x-ray readable component 30A and a human visible component 30B. Substrate 320 may be any material that does not interfere with the x-ray imaging of x-ray readable component 30A of indicia 310, and may be, for example, a non-metallic material, such as plastic. Marker 300 has fixing device 330 that may be used to affix marker 300 to a container to be scanned.

Figure 4:
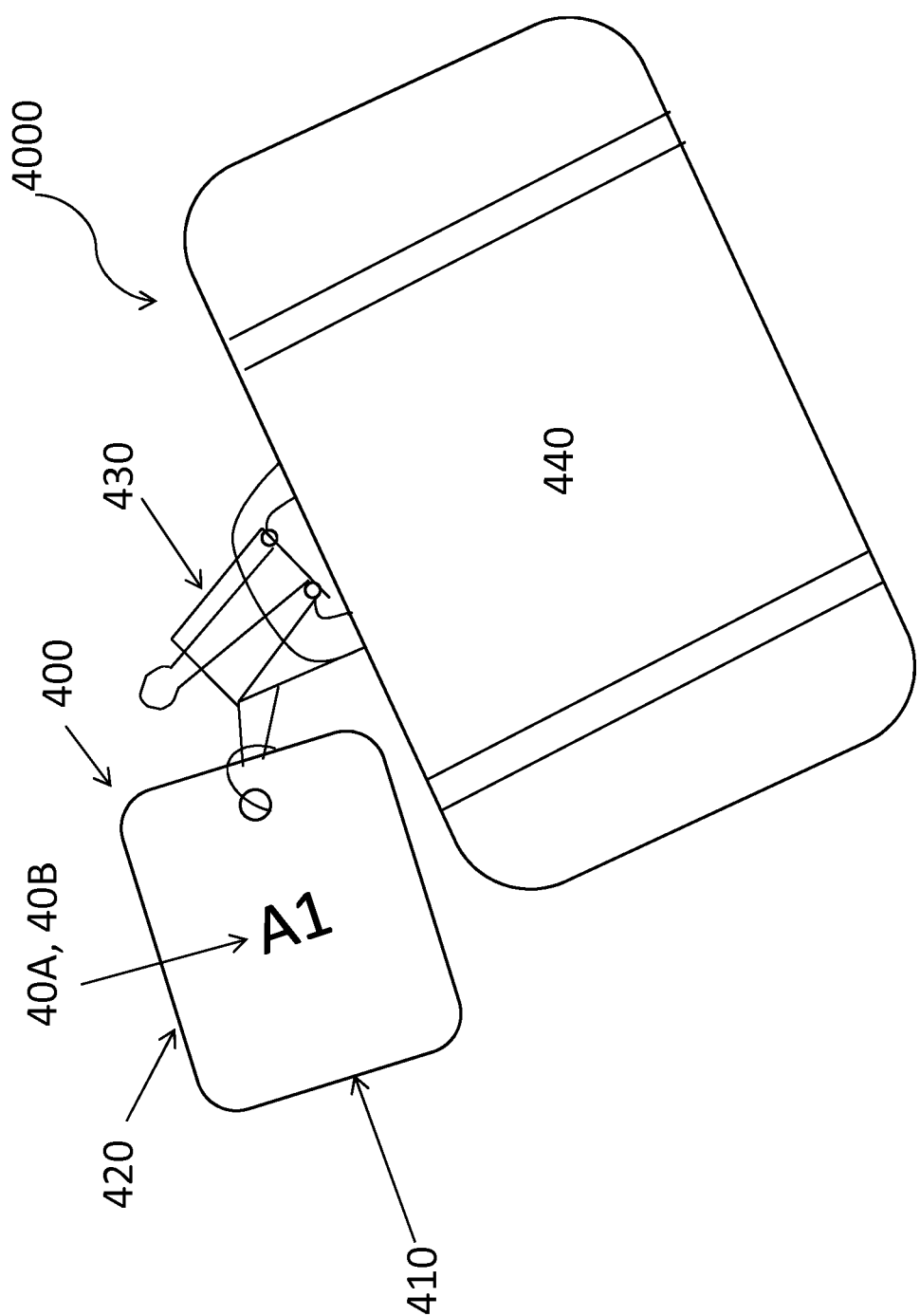
FIG. 4 is a system view of a security system using an x-ray marker in accordance with aspects and embodiments.

For example and referring to marking system 4000 of FIG. 4, a security officer may affix marker 400 to container 440 by fixing device 430. Marker 400 comprises indicia 410 having an x-ray readable component 40A and a human visible component 40B on a substrate 420. When marker 400 and container 440 undergo x-ray screening, an x-ray image of marker 400 and container 440 are displayed to an operator of the x-ray machine. X-ray readable component 40A of indicia 410 is visible in the x-ray image. When container 440 and marker 400 have been imaged, an operator may easily identify container 400 by looking at the human visible component 40B of indicia 410. If, after review of the x-ray image of container 440 an operator determines that there is an item of interest in container 440, the operator may easily identify container 440 by marker 400 and further investigate the item of interest.

In accordance with some embodiments, the markers of the present disclosure may comprise an x-ray component and another, corresponding, identification component in addition to, or in the alternative to, a human visible component. The markers of the present disclosure may have indicia comprising an x-ray readable component and corresponding indicia may be on the marker in the form a microchip or an RFID tag capable of providing information to an identification device. The identification device may be, for example, a hand held computer capable of identifying the location of marked items by a global positions system application, or may, for example, be an RFID scanner capable of outputting information, including indicia stored in the RFID tag, that corresponds to the x-ray readable indicia of the marker, and/or the location of the marker.

It is to be appreciated that embodiments of the apparatus and methods discussed herein are not limited in application to the details of construction and the arrangement of components as set forth in the above description or illustrated in the accompanying drawings. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. An x-ray screening accessory comprising:
a bin including a marker, which is both x-ray readable and human visible, and which is one of printed on the bin, embedded in the bin, or molded into the bin, the marker forming a coordinate system on the bin.

2. The accessory of claim 1, wherein the marker uniquely identifies the bin.

3. The accessory of claim 1, wherein the marker identifies the bin using a string of characters.

4. The accessory of claim 1, wherein the marker forms a measuring tool on the bin.

5. The accessory of claim 1, wherein the marker is applied to the bin by a printing operation.

6. The accessory of claim 1, wherein the marker comprises metallic ink.

7. The accessory of claim 1, wherein the marker comprises a metallic polymer.

8. The accessory of claim 1, wherein the bin comprises a plastic receptacle.

9. The accessory of claim 1, fu er comprising an RFID tag.

10. The accessory of claim 9, wherein the RFID tag is configured to provide information to an identification device regarding a location of the accessory.

11. The accessory of claim 9, wherein the RFID tag is configured to provide identification information to an identification device.

12. An x-ray screening accessory comprising:
a bin including a first and second marker, wherein both markers are both x-ray readable and human visible;
wherein the first marker is capable of identifying the bin using a string of characters; and
the second marker forms a measuring tool including a coordinate system capable of identifying a measurement of length along at least one portion of the bin and is one of printed on the bin, embedded in the bin, or molded into the bin.

13. A method of facilitating x-ray security screening, the method comprising:
providing a bin including a marker, which is both x-ray readable and human visible and which is one of printed on the bin, embedded in the bin, or molded into the bin, the marker forming a measuring tool including a coordinate system capable of identifying a measurement of length along at least one portion of the bin; and
providing instructions for placement of a container to the screened in the bin.

* * * * *